Figure 2:
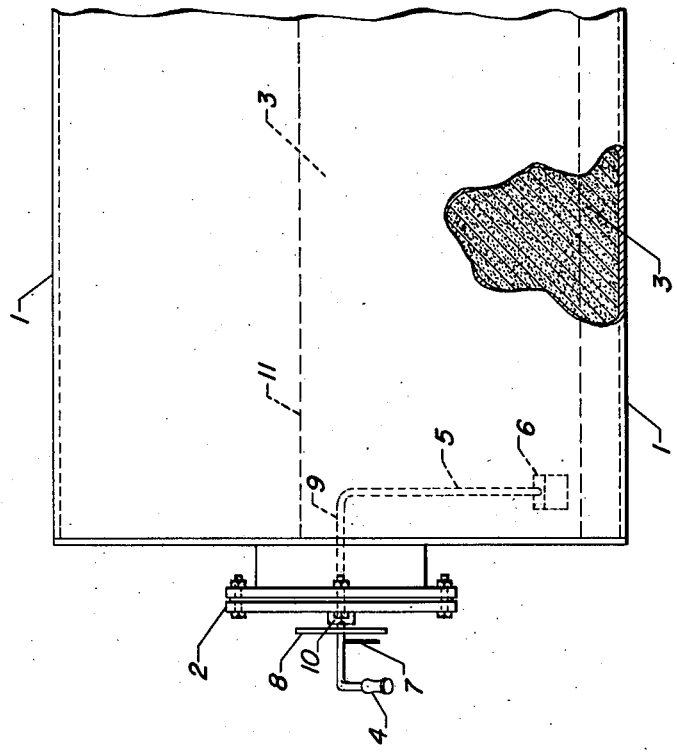

Oct. 8, 1957

H. S. BLOCH ET AL 2,808,724

INVENTORY MEASURING DEVICE

Filed April 28, 1955

2 Sheets-Sheet 1

INVENTORS:
Herman S. Bloch
Victor E. Henny

By:

Chester J. Giuliani
ATTORNEY:

Glen R. Grunewald
AGENT:

Oct. 8, 1957     H. S. BLOCH ET AL     2,808,724
INVENTORY MEASURING DEVICE
Filed April 28, 1955     2 Sheets-Sheet 2

INVENTORS:
Herman S. Bloch
Victor E. Henny
By: Chester J. Giuliani
ATTORNEY:
Glen R. Grunewald
AGENT:

United States Patent Office 2,808,724
Patented Oct. 8, 1957

2,808,724
INVENTORY MEASURING DEVICE

Herman S. Bloch, Chicago, and Victor E. Henny, Elmhurst, Ill., assignors to Universal Oil Products Company, Des Plaines, Ill., a corporation of Delaware Application April 28, 1955, Serial No. 504,644

1 Claim. (Cl. 73—317)

This invention relates to an inventory measuring device and particularly to a means for determining the inventory of material in a rotary kiln, mixer, digester or the like.

A device in the nature of a rotary kiln may generally be described as an apparatus consisting of a rotating cylindrical chamber which rotates around the longitudinal axis of the cylinder with said longitudinal axis in a non-vertical position. Rotary kilns are frequently very large in size and are used very often under high temperature conditions, as well as sometimes under high pressures.

Some specific uses for this class of apparatus are for drying particulate solid material such a sand, gravel, salts, adsorbents or catalyst supports wherein excess entrained water may be removed from the material being dried or water of hydration may be removed by tumbling the solid particles in a stream of hot gas. In other uses an apparatus of this nature may be used for reacting material. For example, in the manufacture of cement the ingredients employed may be charged to the rotary kiln and after being exposed to suitable conditions for a suitable length of time with continuous mixing due to the tumbling action produced in the kiln, reactions between the various constituents occur to form the desired product. In still another adaptation, this class of apparatus may be used for contacting solids with liquids, such as for digesting solids in acids, washing solids with liquids or extracting certain constituents from solids with suitable solvents.

It is frequently necessary in employing a rotary kiln type apparatus for a beneficial treatment of a solid material to determine the inventory of the solid material therein. In many cases when the inventory is not critical it may be determined simply by observing the interior of the kiln, however, in many cases an accurate measurement of the inventory is required or the interior of the kiln is not visible because it is sealed from the atmosphere. It is an object of this invention to provide a means for accurately measuring the inventory of material in a rotary processing apparatus of the type described.

It is an embodiment of this invention to provide a rotating apparatus which rotates around a non-vertical axis and has a circular type cross-section perpendicular to said axis with an inventory measuring means comprising in combination a probe, a probe positioning rod, a protractor, a probe position indicator and an interface distinguishing means, with said probe connected with one end thereof to said interface distinguishing means and at the other end thereof to said probe positioning rod, said probe positioning rod passing through the center of said protractor and connecting to said probe position indicator at a point where the latter is in close proximity to said protractor. A circular type cross section as used in this specification and the following claim means a cross section which is a circle or a regular polygon having five or more sides which would approximate a circle as far as its function in this invention is concerned.

Figure 4:
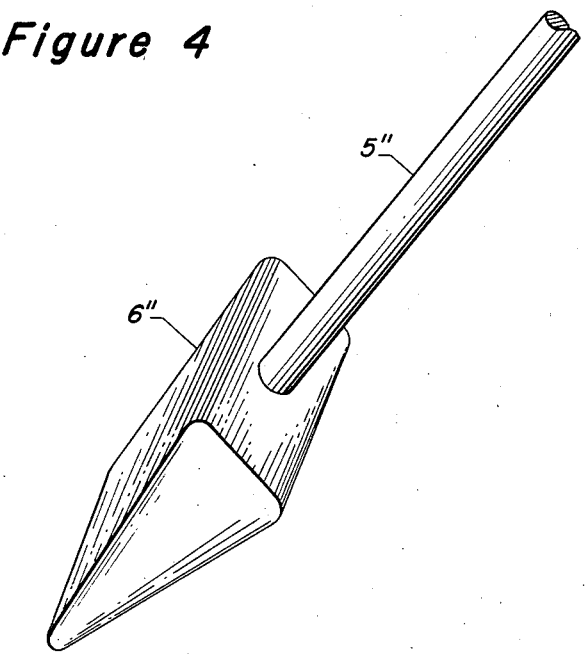

Briefly, then, the basis of this invention is to determine the inventory of solid material in the rotating kiln type of apparatus by determining the position of the chord formed by the level of the solid material as seen in cross section through a rotating probe device which measures the angle this chord subtends between segments of radii of fixed length which intersect it at a given distance from the center of the cylinder. The apparatus of this invention and its mode of operation may be best described with reference to the accompanying drawings which illustrate in Figures 1 and 2 an elevation and side view of one embodiment of this invention and in Figure 3 an isometric view of the improved inventory measuring apparatus. Figure 4 shows one interface distinguishing means which is suitable for use in this invention.

Figure 1:
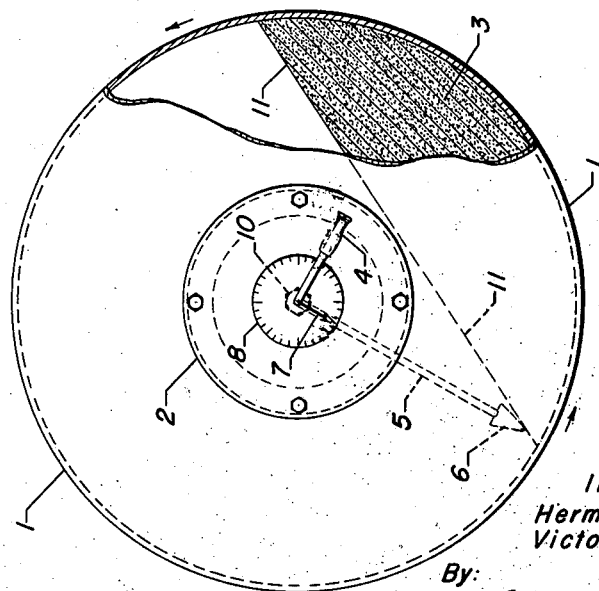

Referring to Figure 1 rotating drum 1 rotates in a counter-clockwise direction causing the level of material 3 contained on the interior thereof to be at an angle shown by broken line 11. The solid material 3 is continuously mixed and agitated by the tumbling action effected when the rotation of the drum causes its angle of repose to be exceeded. The inventory measuring apparatus of this invention is attached to drum 1 in this embodiment through flange 2 which closes off the interior of drum 1 from the atmosphere. The inventory measuring device consists of probe 5 which in this embodiment is perpendicular to the axis of rotation and which is connected to interface distinguishing means or feeler 6 disposed on the end of the probe. Probe 5 connects to a probe positioning rod 9 which runs axial with the cylinder, which passes through flange 2 and the center of a protractor 8, connecting both to a probe position indicating means 7 and a manipulating handle 4.

The means of determining the inventory with the apparatus as hereinabove described is as follows. Handle 4 is manipulated to turn the probe inside of the rotating drum to a position wherein interface distinguishing means 6 contacts the solid material maintained in the drum. This, in the position shown, is at the lower end of the angularly disposed pile of solid material in the drum and indicates one position of the interface therein. Probe position indicating pointer 7 in conjunction with protractor 8 will indicate a setting in the protractor which may be recorded or, when the protractor is suitably constructed it may be turned so that this position is established as the zero point from which the measurement begins. When the initial setting is recorded or the zero point established handle 4 is manipulated in a clockwise direction so that probe 5 travels in a clockwise direction until interface distinguishing means 6 comes into contact with the upper portion of the pile of material disposed therein. The position of the probe in contact with the upper portion of the pile is then read from the protractor at the point indicated by probe position indicating means 7 and, as may be readily seen, the angle subtended between the two positions of the probe may be calculated or, if the zero point is set, read directly. With the subtended angle, the length of probe 5, and the diameter of the drum known, the interface of the solid material, representing a chord of a circle in the cross-section of the drum, is determined, and its area may be calculated, from which area the volume or inventory of solid material is readily obtained. In a preferred embodiment a table or graphic representation may be employed whereby inventory may be read directly from the finding of the subtended angle, thereby avoiding the necessity of making multiple and time consuming calculations.

Figure 2 as hereinbefore stated shows a side view of the apparatus described in Figure 1. Figure 2 more readily indicates the relationship of probe 5 to probe positioning rod 9 and to handle 4. The apparatus as shown in Figure 2 also better illustrates how packing gland 10 may be disposed in flange 2 so that the interior of drum 1 is sealed from the atmosphere while at the same time probe 5 in the interior thereof may be manipulated from outside. Probe positioning rod 9 may be of any suitable length and adapted so that it slides to different positions and measures the subtended angle at various points along the length of drum 1, however, in this embodiment the length of rod 9 is relatively short. Figures 1 and 2 show the rotary kiln type apparatus disembodied from the means for effecting rotation, however it is contemplated that any suitable or well-known method of effecting rotation of the drum may be employed. The protractor means, however, will preferably not rotate with the drum inasmuch as it would be difficult to obtain accurate readings unless the rate of rotation were extremely slow.

Figure 3:
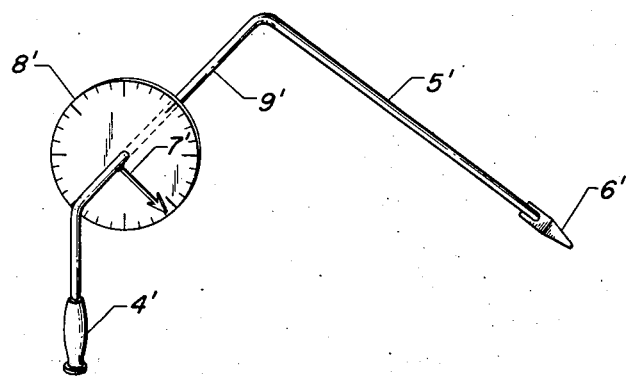

As hereinbefore stated Figure 3 illustrates the inventory measuring mechanism disassociated from the drum in which it normally is disposed as pictured in Figure 1. In all of these embodiments handle 4', rod 9', and probe 5' are shown as a single continuous piece of metal which is bent at the proper position and at the proper angle to perform its function. It is, of course, not intended to limit the invention to this construction since suitable joints or elbows may be employed at the corners so that the apparatus may be more readily assembled and disassembled for manufacture and installation. Other suitable variations may be made in the shape, length or other contours of the probing mechanism without departing from the broad scope of this invention.

Figure 4 shows mainly one embodiment of a suitable interface distinguishing means. In this figure 5" represents the portion of the probe that connects to interface distinguishing means 6" which in this case is a triangular prism having broad surfaces for contacting the solid material so that it will tend to ride on top of the bed rather than to be engulfed in it. In some embodiments interface distinguishing means 6" may be made of sheet material so that it is hollow and therefore light weight and buoyant thereby being more adaptable to distinguishing the interface between a mixed solid and liquid phase and a gas phase. The interface distinguishing means may also be an articulated plate which is hinged at a point adjacent the probe so that it may always assume a position to produce maximum bearing upon the surface of the solids. Many other suitable shapes may be employed as well as those specifically described herein.

Many modifications of the equipment may be made without departing from the broad scope of this invention. The protractor employed may be any suitable angle measuring means which may be read in any units desired and need not have any particular shape. Mechanical equivalents may likewise be substituted for the probe, probe positioning rod or the position indicator.

We claim as our invention:

In combination with a rotating drum which rotates around a non-vertical axis and has a circular type cross-section perpendicular to said axis, inventory measuring means comprising a stationary circular angle measuring scale adjacent an exterior end portion of said drum and having its center in alignment with the axis of rotation of the drum, a probe positioning rod extending through the center of said scale and axially into the drum, a probe connected at one end thereof to the inner end of said rod and positioned within the drum perpendicular to the axis of rotation of the drum, a feeler at the other end of said probe, an indicating pointer fixed to said rod exteriorly of the drum and disposed in close proximity to said scale, and a manipulating handle on the outer end of said rod.

References Cited in the file of this patent

UNITED STATES PATENTS

| | | |
|---|---|---|
| 695,007 | Strutt | Mar. 11, 1902 |
| 1,118,075 | Tooney | Nov. 24, 1914 |
| 1,119,545 | Shaw | Dec. 1, 1914 |
| 2,680,298 | Obenshaw | June 8, 1954 |